Nov. 11, 1924.
A. SMITH
1,515,226
CORN HARVESTER AND HUSKER
Filed May 9, 1924   5 Sheets-Sheet 3
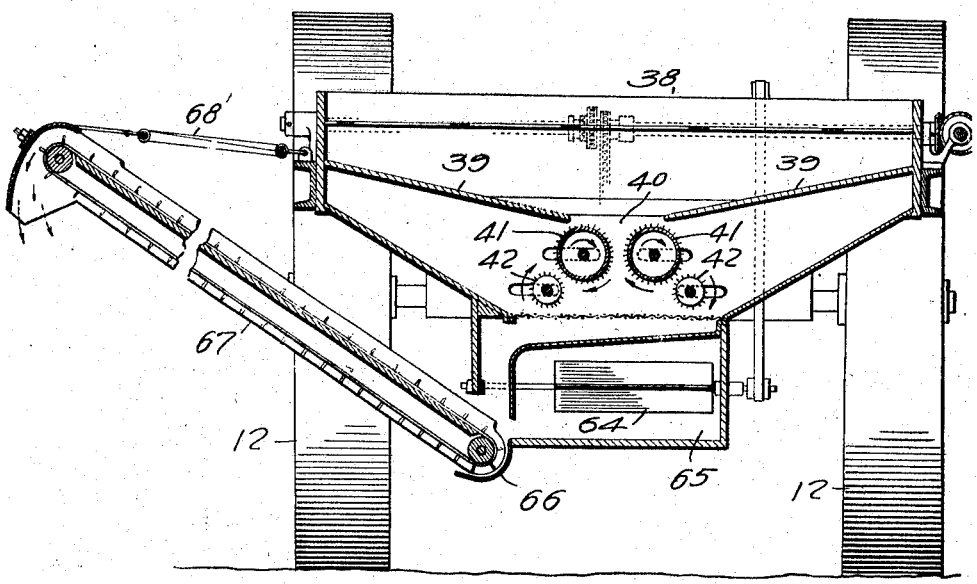
Fig. 4.
Fig. 5.
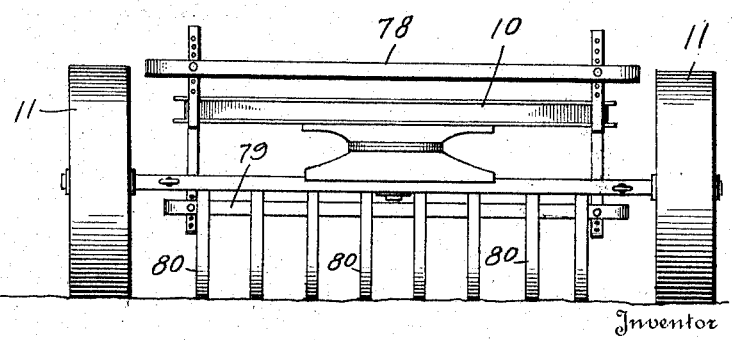
Inventor
AUGUSTUS SMITH,
By Frank R. Allen
Attorney Nov. 11, 1924.
A. SMITH
1,515,226
CORN HARVESTER AND HUSKER
Filed May 9, 1924   5 Sheets-Sheet 4
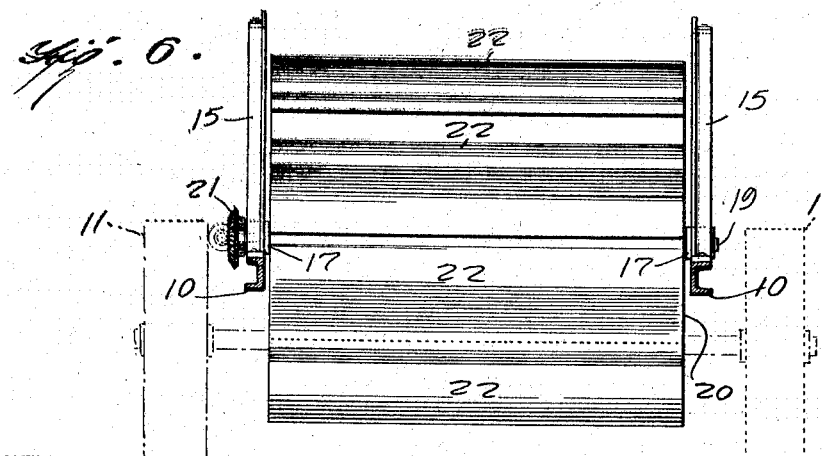
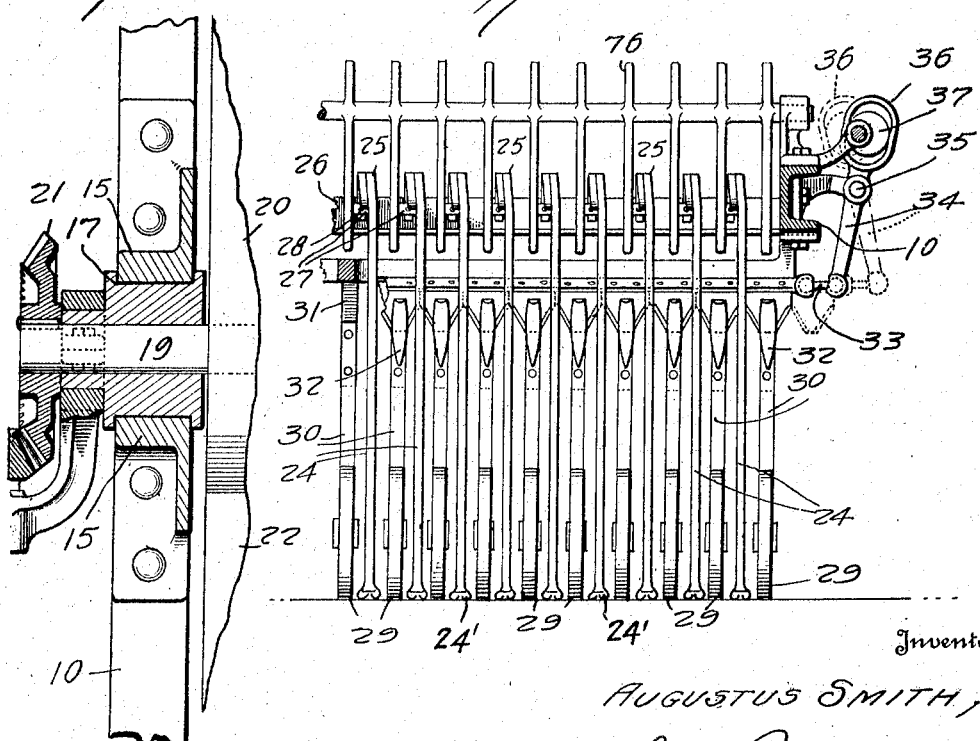
Inventor
AUGUSTUS SMITH,
By Chas. R. Allen
Attorney Nov. 11, 1924.                                                  1,515,226
                              A. SMITH
                     CORN HARVESTER AND HUSKER
                       Filed May 9, 1924          5 Sheets-Sheet 5

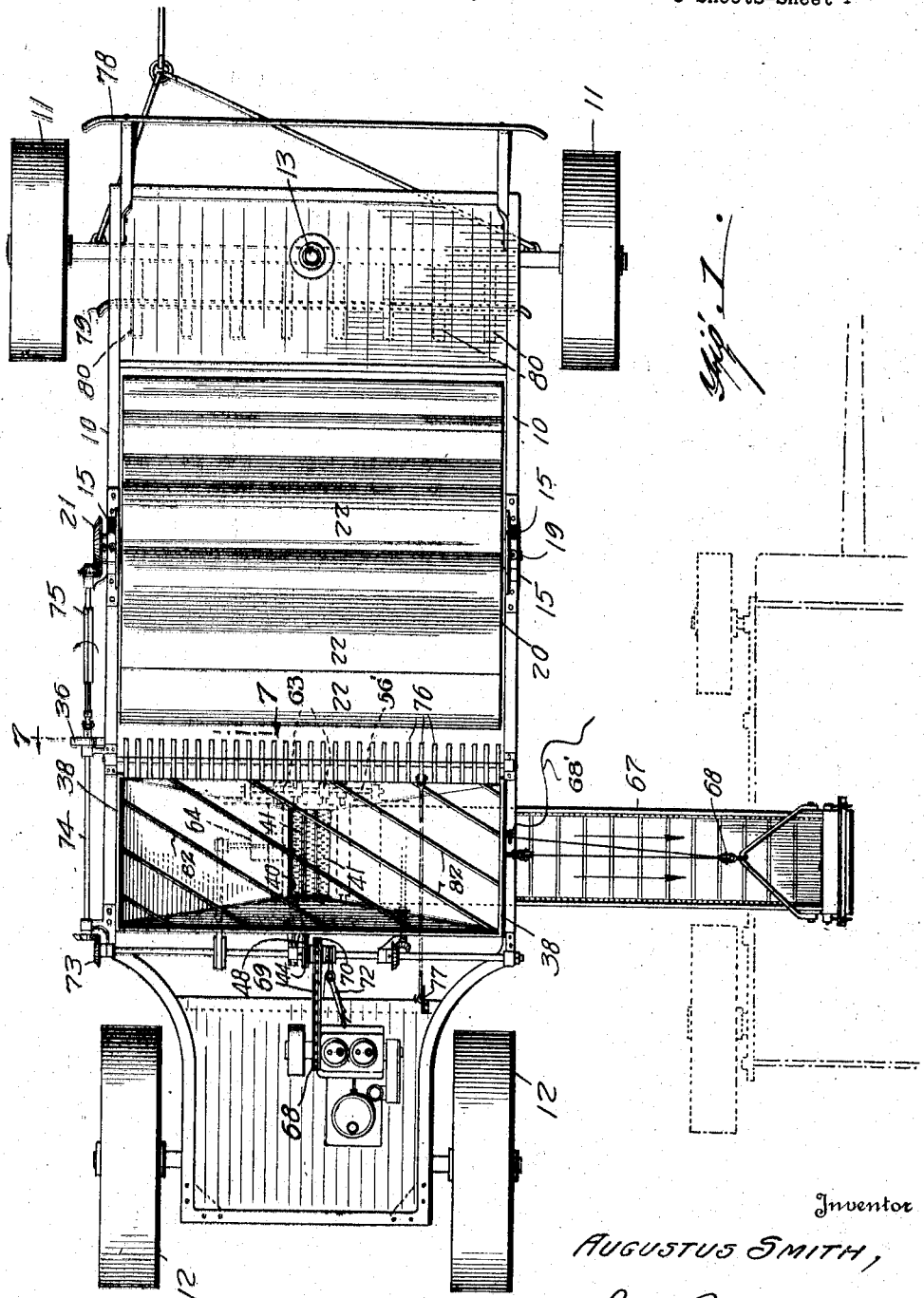

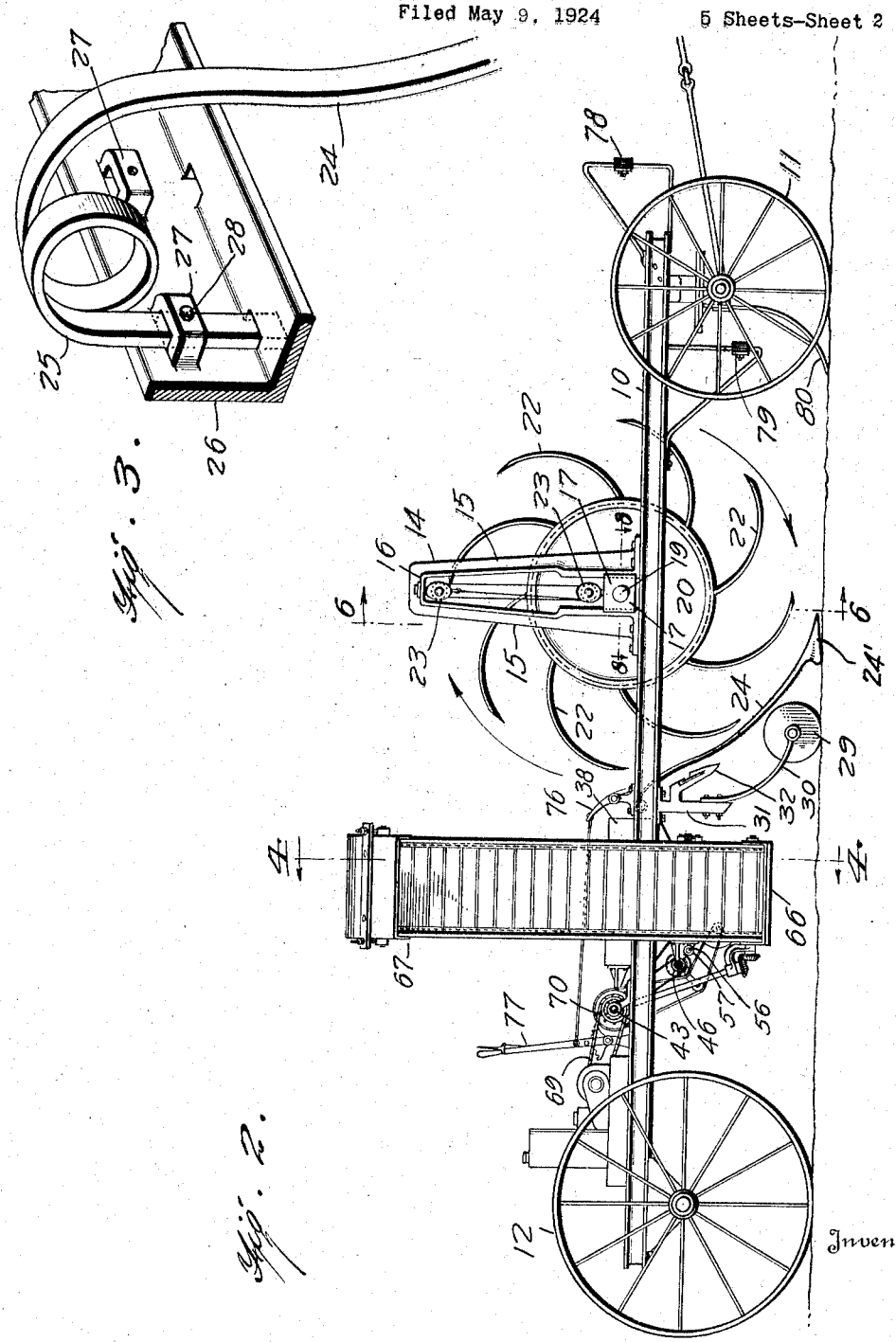

Inventor
Augustus Smith,
By
Attorney

Patented Nov. 11, 1924.

1,515,226

UNITED STATES PATENT OFFICE.

AUGUSTUS SMITH, OF SHARON SPRINGS, KANSAS.

CORN HARVESTER AND HUSKER.

Application filed May 9, 1924. Serial No. 712,063.

*To all whom it may concern:*

Be it known that I, AUGUSTUS SMITH, a citizen of the United States, residing at Sharon Springs, in the county of Wallace and State of Kansas, have invented certain new and useful Improvements in Corn Harvesters and Huskers, of which the following is a specification.

My invention is in the nature of an improved corn harvester, designed to cut the trash that may accumulate in the teeth, keeping them free and clear of trash while operating in the field, to pull or strip the ears of corn from the stalks, and also pick up the loose ears off the ground, and remove the husks from the ears by the passage of the machine across the field. It is so organized as to conduct these operations in a continuous way by a simple, practical and effective construction. To press down and roll the stalks to a level surface with the corn, will facilitate its subsequent cultivation. The scope of my invention extends to whatever construction may be defined by or included within the terms or language of the appended claims.

In the drawings:

Figure 1 is a top plan view of my improved corn harvester;

Figure 2 is a side view thereof;

Figure 3 is a detail perspective view illustrating the means for fastening my improved raked teeth;

Figure 4 is a section on the line 4—4 of Figure 2;

Figure 5 is an elevation of the front end;

Figure 6 is a section on the line 6—6 of Figure 2;

Figure 7 is a detail section on the line 7—7 of Figure 1;

Figure 8 is a section on the line 8—8 of Figure 2;

Figure 9:
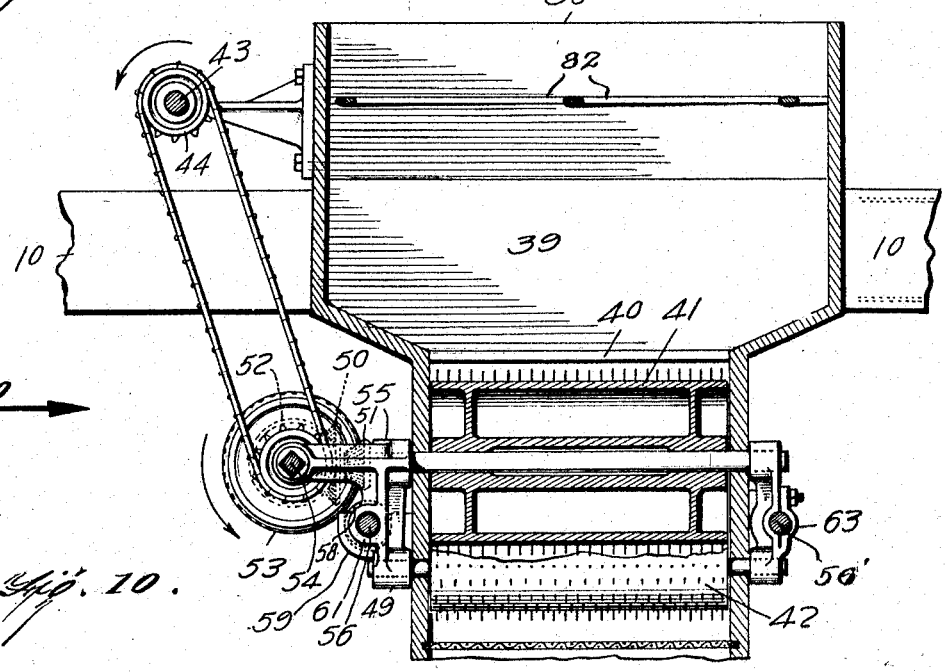
Figure 9 is a transverse section on the line 9—9 of Figure 10.

My invention, in the form or embodiment shown in the drawings and briefly described, comprises a frame, 10, constructed of channel iron or of other suitable material and has mounted thereon the usual forward and rearward wheels, 11 and 12. The front wheels, 11, are pivoted as at 13, as is clearly shown in Figure 1.

Mounted upon the upper portion of the frame, 10, are a pair of upwardly extending members, 14, and are made secure to the frame by means of rivets or bolts. The members, 14, are each provided with a pair of vertically extending arms, 15, and a horizontally extending connecting member, 16. The lower portions of the members, 15, between their inner opposing surfaces are equidistantly spaced for the purpose of forming a bearing for the slidably mounted block or journal box, 17, which is clearly illustrated in detail in Figure 8.

The shaft, 19, to which is secured the rotatable drum, 20, is loosely mounted for rotation in the journal box, 17, and has keyed on one of its ends a bevel gear, 21, which will be hereinafter more fully described.

The drum, 20, has secured to its outer surface a plurality of curved sheet metal plates, 22, which extend across the entire length of the drum, as is clearly shown in Figure 6. For raising or lowering the drum, 20, together with its respective plates, 22, I provide a pair of pulleys, 23, for each of the standards, 14, which, by means of the usual hoisting cables, may be readily operated as desired. One of the pulleys will, of course, be mounted to the journal box, 17, whereas the other will be secured to the uppermost cross member, 16, of the standard, 14.

Immediately behind the assembled drum, 20, is a plurality of rake teeth, 24, which are preferably formed of somewhat yieldable material and each terminates in a foot piece or shoe, 24', which is adapted to ride upon the ground for effectively elevating the corn. The body portion of each of the rake teeth are turned so that the plates, 22, of the drum will very readily move the corn in its upward travel. The upper portions of the rake teeth are formed with a coil or loop, 25, for the purpose of giving resiliency to each rake tooth separately. Each rake tooth is held in its respective position by means of an angle iron, 26, which extends transversely across the frame, 10, and is provided with loop portions, 27, through which are passed cap screws, 28, or other suitable fastening means. I have found by experience that by spacing the rake teeth about two inches apart, very satisfactory results are obtained.

At the rear of the rake teeth, 24, are rotatably mounted a plurality of rolls or presser wheels, 29, which are supported by means of flexible or resilient arms, 30, and are secured at their upper ends to the arms, 31, which is, in turn, carried by the frame, 10. The rollers, 29, are formed relatively narrow so that they may be readily placed intermediate the rake teeth, 24, as is clearly illustrated in Figure 7 of the accompanying drawings.

A sickle, 32, extending across the width of the machine, is mounted immediately below the rake teeth, 24, and is carried by the arms, 31. The reciprocating knives for the sickle have connection with ball and socket joints, 33, one of which being integral with a rock arm, 34, which is pivoted as at 35. The rock arm, 34, is upwardly extended and terminates in a slotted yoke, 36, for the reception of an eccentric, 37, the operation of which will be readily seen as the description proceeds.

Figure 10:
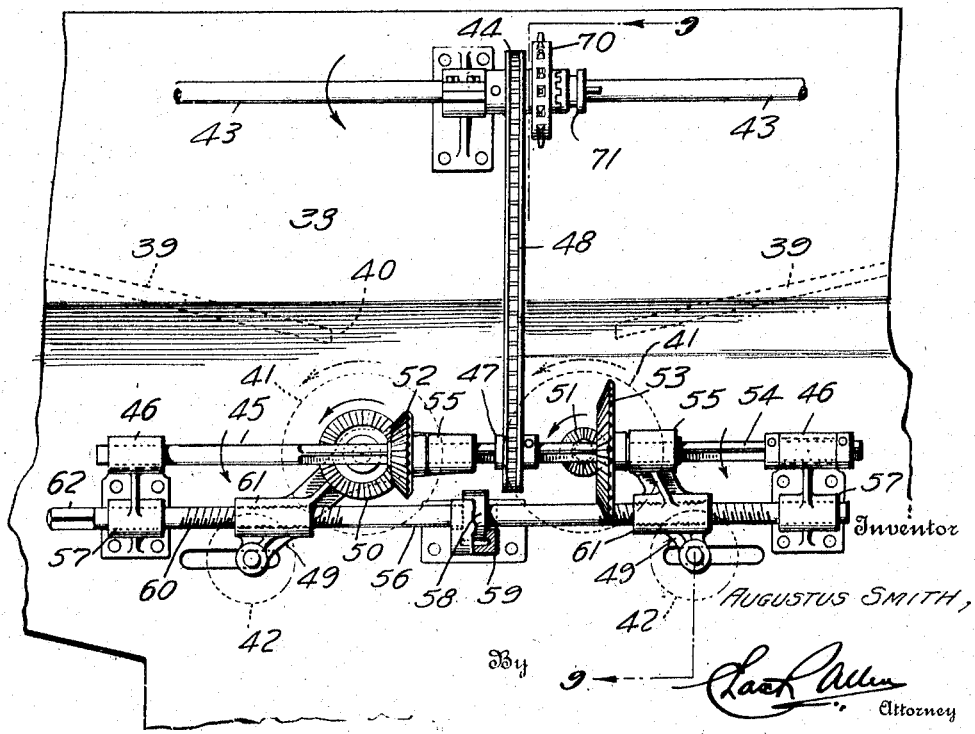
Figure 10 is a side elevation of the mechanism shown in Figure 9 looking in the direction of the arrow 10.

A slight distance rearward of the rake teeth, 24, and the sickle, 32, is mounted my corn husking mechanism, 38. Said corn husking device consists of a rectangular box or receiver, which is fitted between the side frame members, 10, and is provided with slanting members, 39, which extend downwardly toward the center and provide an oblong opening, 40, through which the corn passes downward to be husked. Immediately below the opening, 40, are a pair of spaced husking rollers or drums, 41. Below and to one side of the rollers, 41, are relatively smaller rollers, 42. The rollers, 41 and 42 are arranged in pairs, that is to say, they are slidably mounted for adjustment in unison. With special reference to Figures 9 and 10, which clearly illustrate my novel adjusting means for the husking rollers, 43 indicates a drive shaft on which is secured a sprocket wheel, 44. A shaft, 45, is mounted between a pair of bearings, 46, which is fastened to the side of the box, 38, and has secured thereon a sprocket wheel, 47, driven from the sprocket, 44, by means of the sprocket chain, 48.

The husking rollers, 41 and 42, are mounted on bearing members, 49, one being located on each side of the box, 38, for supporting the outer ends of the roller shafts. Secured to the shafts of the husking rollers, 41, are bevel gears, 50 and 51, which mesh with gears, 52 and 53 respectively. The bevel gears, 52 and 53, are slidably mounted on the squared portion, 54, of the shaft, 45, and are held in mesh with their mating gears by means of the abutting bearings, 55, which are integral with the bearing members, 49.

It is often desirable to adjust the relative distance between the husking rollers, which I accomplish by means of a shaft, 56, journalled in bearings, 57, and which is provided in its approximate center with an enlargement, 58. To prevent the shaft, 56, from moving lengthwise, I secure a member, 59, to the body of the box, 38, which is adapted to straddle the enlarged portion, 58. The shaft, 56, is further provided with oppositely threaded portions, 60, which are adapted to engage with interiorly threaded bearings, 61, which are also cast integral with the bearing members, 49. For rotating the shaft, 60, which will affect the adjustment of the husking rollers, I provide one of the ends of the shaft, 56, with a squared portion, 62. After the proper adjustments have been made to the husking rollers, they may be, of course, clamped in that position by means of the split bearings, 63, which are slidably mounted on a stationary shaft or rod, 56'. The shafts 56 and 56' are located on opposite sides of the box, 39, and are parallel with respect to each other.

I have found by experience that it is desirable that both of the oppositely disposed sets of husking rollers be rotated at relatively different speeds, as, for example, one pair to rotate three times as fast as the other. For this reason I differentiate in the dimensions of the gears, 51 and 52, together with their mating gears, 52 and 53.

A fan, 64, is provided in a reduced compartment, 65, formed on the main rectangular box, 38, the bottom of which is provided with a curved deflector plate or apron, 66. An endless belt carrier or hoist, 67, is pivotally mounted at the lower end of the box, 38, adjacent to the compartment, 65, for the purpose of conveying the corn and loading it into wagons or other carriers which may run alongside of the machine; for example, as indicated in dotted lines in Figure 1. I provide cable 68' and pulley connection between the upper portion of the conveyor and the frame of the machine for the purpose of adjusting the conveyor to various heights.

Although I may operate my corn harvesting mechanism with power taken from the rear wheels, I have illustrated a diagrammatic form of engine on which is mounted a sprocket wheel, 68. A sprocket chain, 69, passes over the sprocket wheel, 68, and drives a sprocket, 70, which is loosely mounted upon the shaft, 43, and is provided on one side thereof with clutch teeth. A slidable clutch member, 71, is keyed to the shaft, 43, and is operated by means of a lever, 72, for disconnecting the engine from the harvesting and husking mechanism.

On one end of the shaft, 43, is fixed a bevel gear, 73, which is adapted to mesh with a mating gear that is keyed to a shaft, 74, running lengthwise of the machine for driving the drum, 20, and the sickle, 32.

75 indicates a sliding or telescopic connection in the shaft, 74, to permit the adjustability of the drum, 20.

I pivotally mount a plurality of arms or forks, 76, on the upper portion of the frame, 10, for the purpose of sweeping or deflecting the corn from the rotating blades, 22, into the rectangular box, 38. This deflector or sweeper, 76, is connected by a rod to a hand lever, 77, for the purpose of adjusting the angle best suit for the operation.

At the extreme front of the machine and attached to the frame thereof is a pair of transversely disposed bars or bumpers, 78 and 79, for the purpose of felling or knocking down the corn stalks. The bumper, 78, is mounted in advance and above the frame, 10, whereas the bumper, 79, is mounted slightly below the frame and rearward of the front axle, as is clearly shown in Figures 2 and 5. The supporting means for both of these bumpers are provided with a plurality of openings to permit their vertical adjustability.

Secured to the front axle at the rear thereof is a plurality of downwardly and rearwardly curved spring members or bars, 80, for the purpose of straightening out the corn stalks into rows.

I provide a plurality of diagonal cross bars or rods, 82, within the box, 38, slightly below the top thereof for the purpose of more readily directing the corn to the husking rollers, 41 and 42, and for preventing any stalks that may possibly be directed thereon from coming in contact with the husking rollers.

Having thus described the various parts of my machine and the operation of the details, following is a brief review of the various steps: The upper bumper, 78, initially contacts the top of the stalks, bends them over in a forward direction, whereupon the curved spring members, 80, tend to evenly separate or comb them apart; the lower bumper, 79, further causes the stalks to droop, whereupon they enter between the rake teeth, 24, from which point the revolving plates, 22, of the drum, 20, force the ears of corn in an upward direction toward the sickle, 32, whence, the ears are severed from the stalks and thrown in an upward direction against the deflector, 76, from which point they fall between the diagonal bars, 82, on to and between the husking rollers, 41 and 42.

I claim:

1. A corn harvester and husker, comprising a main frame, a pair of bumpers at the front end thereof arranged at different heights, a plurality of ground engaging spring members, located between said bumpers, a rotary drum having a plurality of curved blades, a plurality of forked teeth each having an enlarged ground-engaging shoe, a plurality of substantially thin, yieldably mounted ground-engaging rollers, a sickle, corn husking means mounted upon the main frame, deflector arms for directing the corn into said husking means and means for rotating the drum and reciprocating the sickle.

2. A corn harvester and husker, comprising a main frame, a pair of bumpers at the front end thereof arranged at different heights, a rotary drum having a plurality of curved blades, means for vertically adjusting said rotary drum consisting of a pair of standards extending upwardly from the frame, a plurality of forked teeth each having an enlarged ground-engaging shoe, a plurality of substantially thin, yieldably mounted ground-engaging rollers, a sickle, corn husking means mounted upon the main frame, deflector arms for directing the corn into said husking means and means for rotating the drum and reciprocating the sickle.

3. A corn harvester and husker, comprising a main frame, a bumper located transversely across the machine and in front of said frame, a second bumper arranged at the rear of and at a lower level of said bumper, means for adjustably securing the bumpers to said frame, a rotary drum having a plurality of curved blades, a plurality of forked teeth each having an enlarged ground-engaging shoe, a plurality of substantially thin, yieldably mounted ground-engaging rollers, a sickle, corn husking means mounted upon the main frame, deflector arms for directing the corn into said husking means and means for rotating the drum and reciprocating the sickle.

4. A corn harvester and husker, comprising a main frame, a pair of bumpers at the front end thereof arranged at different heights, a plurality of downwardly and rearwardly curved ground-engaging members secured to the front axle, a rotary drum having a plurality of curved blades, means for vertically adjusting said rotary drum consisting of a pair of standards extending upwardly from the frame, a plurality of forked teeth each having an enlarged ground-engaging shoe, a plurality of substantially thin, yieldably mounted ground-engaging rollers, a sickle, corn husking means mounted upon the main frame, deflector arms for directing the corn into said husking means, means for adjustably regulating the angle of said deflector arms and means for rotating the drum and reciprocating the sickle.

5. A corn harvester and husker, comprising a main frame, a pair of bumpers at the front end thereof arranged at different heights, a rotary drum having a plurality of curved blades, a plurality of forked teeth each having an enlarged ground-engaging shoe at their lower ends and a yieldable coil at the opposite ends thereof adjacent to their points of connection with the main frame, a plurality of substantially thin, yieldably mounted ground-engaging rollers, a sickle, corn husking means mounted upon the main frame, deflector arms for directing the corn into said husking means and means for rotating the drum and reciprocating the sickle.

6. A corn harvester and husker, comprising a main frame, a rotary drum having a plurality of curved blades, means for vertically adjusting said rotary drum, a plurality of yieldable ground-engaging members, each having a shoe on the outer end thereof, a plurality of ground-engaging rollers, a sickle, a rectangular corn receiving box, two pairs of oppositely disposed spiked rollers, means for driving each pair of said rollers at different speeds, an endless conveyor pivotally mounted adjacent to said box and means for operating the parts substantially as and for the purpose described.

In testimony whereof I affix my signature.

AUGUSTUS SMITH.